US010269462B2

(12) United States Patent
Richardson

(10) Patent No.: US 10,269,462 B2
(45) Date of Patent: Apr. 23, 2019

(54) SEMI-SUBMERSIBLE NUCLEAR POWER PLANT AND MULTI-PURPOSE PLATFORM

(71) Applicant: David W. Richardson, Cardiff, CA (US)

(72) Inventor: David W. Richardson, Cardiff, CA (US)

( * ) Notice: Subject to any disclaimer, the term of this patent is extended or adjusted under 35 U.S.C. 154(b) by 0 days.

(21) Appl. No.: 15/894,608

(22) Filed: Feb. 12, 2018

(65) Prior Publication Data

US 2018/0254115 A1    Sep. 6, 2018

Related U.S. Application Data

(63) Continuation of application No. 14/597,152, filed on Jan. 14, 2015, which is a continuation of application No. 13/540,438, filed on Jul. 2, 2012.

(51) Int. Cl.
*G21D 1/00* (2006.01)
*G21D 3/04* (2006.01)
(Continued)

(52) U.S. Cl.
CPC .............. *G21D 1/00* (2013.01); *B63B 35/44* (2013.01); *G21C 13/02* (2013.01); *G21D 3/04* (2013.01);
(Continued)

(58) Field of Classification Search
CPC ... G21D 1/00; G21D 3/04; G21D 5/02; B63B 35/44; B63B 2035/4446; G21C 13/02; G21C 11/04; G21C 13/024
(Continued)

(56) References Cited

U.S. PATENT DOCUMENTS 3,572,041 A    3/1971   Graaf
3,837,308 A    9/1974   Harvey et al.
(Continued)

FOREIGN PATENT DOCUMENTS

CN        203826014 U  *  9/2014   .............. Y02E 30/40

OTHER PUBLICATIONS

Jurewicz, "Spar-type Platform Design for the Offshore Floating Nuclear Power Plant", The 10th International Topical Meeting on Nuclear Thermal-Hydraulics, Operation and Safety (NUTHOS10-1104), Dec. 2014, 12 pages. (Year: 2014).*
(Continued)

*Primary Examiner* — Jack W Keith
*Assistant Examiner* — Daniel Wasil
(74) *Attorney, Agent, or Firm* — Timothy W. Fitzwilliam

(57) ABSTRACT

An offshore, floating, moored, nuclear power generating and multi-purpose platform is disclosed. In a preferred embodiment, the invention is a spar platform with multi-purpose, topside decks, attached to a submerged dry tank that further includes: reactor generator deck(s), power plant main control deck, and central plant deck, that are all integrated within a watertight ballast hull. The invention further includes cells that are modular for facilitating factory assembly and ultimate construction in a shipyard environment. Reactor vessels are typical naval nuclear reactor having a time tested outstanding safety record. A plurality of reactor generator modules operate independently and collectively. Multipurpose topside decks house vessel command, crew, and any ancillary and co-generation equipment. The present invention, constructed in a multi-path manufacturing process, provides exceptional economic, environmental, sustainability, security, safety, and operational benefits to users.

4 Claims, 4 Drawing Sheets

(51) Int. Cl.
*B63B 35/44* (2006.01)
*G21C 13/02* (2006.01)
*G21C 11/00* (2006.01)
*G21C 11/04* (2006.01)
*G21C 13/024* (2006.01)

(52) U.S. Cl.
CPC . *B63B 2035/442* (2013.01); *B63B 2035/4446* (2013.01); *G21C 11/00* (2013.01); *G21C 11/04* (2013.01); *G21C 13/024* (2013.01); *Y02E 30/40* (2013.01)

(58) Field of Classification Search
USPC .................................. 376/317, 282, 911, 912
See application file for complete search history.

(56) References Cited

U.S. PATENT DOCUMENTS

| | | |
|---|---|---|
| 3,962,877 A | 6/1976 | Schiemichen |
| 4,302,291 A | 11/1981 | Severs et al. |
| 4,919,882 A | 4/1990 | Aul et al. |
| 5,247,553 A | 9/1993 | Herring |
| 6,227,137 B1 | 5/2001 | Allen et al. |
| 7,197,999 B2 | 4/2007 | Murray |
| 7,978,806 B1 | 7/2011 | Hayman, III |
| 2009/0256421 A1 | 10/2009 | Chung |
| 2011/0158370 A1 | 6/2011 | Morgan |
| 2011/0265701 A1 | 11/2011 | Murry et al. |
| 2013/0042613 A1 | 2/2013 | Ross et al. |

OTHER PUBLICATIONS

Norld Nuclear News, "Nuclear Power in Russia," on-line trade journal, May 2012.
Wikipedia, "MH-1A," on-line free encyclopedia, May 2012.

* cited by examiner

SEMI-SUBMERSIBLE NUCLEAR POWER PLANT AND MULTI-PURPOSE PLATFORM

PRIORITY CLAIM

This patent application is a continuation and claims benefit of the priority date of U.S. patent application Ser. No. 14/597,152 filed on Jan. 14, 2015, entitled Semi Submersible Nuclear Power Plant and Multipurpose Platform; which in turn is a continuation-in-part and claims benefit of the priority date of U.S. patent application Ser. No. 13/540,438 filed on Jul. 2, 2012, accordingly, the entire contents of these patent applications are hereby expressly incorporated by reference.

BACKGROUND OF THE INVENTION

Field of the Invention

The present invention pertains generally to nuclear power plants and more specifically to an offshore, floating, moored, nuclear power generating plant, integrated into the submerged hull of a spar or cell spar platform. More specifically, the present invention relates to an offshore nuclear power plant comprised of a multiplicity of individual spar cells each containing a reactor vessel.

Description of the Prior Art

There exists unequivocal evidence that man made contributions to global warming through increased emissions of heat and greenhouse gases from various forms of carbon fuel combustion, can and must be eliminated to allow our ecosystem to sustainably continue to provide a habitable environment. This fact, combined with rapidly diminishing hydrocarbon reserves (i.e. coal and natural gas) and constantly escalating fuel costs, has ignited a growing global effort to shift to a sustainable, renewable energy powered future. Presently, there is a global consensus among energy experts that, in order to make the required leap from the current unsustainable energy status quo, a new generating technology is required to provide a bridge to sustainable, all renewable energy powered future.

Nuclear energy has traditionally shown the most promise for affordable, clean, reliable power. All commercial nuclear power plants in the United States are currently sighted on land, most on residentially valuable coastal, river or lake shores for access to cooling water. Sighting nuclear power plants on coastal locations results in the installations being vulnerable to seismic events, cyclones and tsunami, thereby escalating the costs of construction and safe operation. The majority of said power plants are also surrounded by high density population centers escalating land and water prices and face growing public resistance to land based nuclear power. These issues have traditionally been the impetus to design sustainable, affordable offshore nuclear power plant.

The principle public, regulatory, and industry concerns regarding land based nuclear power plants include: protection from operational nuclear accidents; protection from nuclear accidents generated by natural calamities; protection from terrorist attacks on nuclear power plants in populated areas; environmental contamination protection from nuclear power plant operations; competition with population needs for water resources; large high value land requirements; expensive, lengthy construction and commissioning times, escalating ratepayer costs; nuclear fuel consumption and resultant waste proliferation; stolen nuclear fuel facilitating illicit nuclear weapons proliferation; and safety and reliability of existing nuclear plants operating past original license term.

In addition to the above concerns, power generating industry must constantly balance the electrical supply to randomly fluctuating demand, often requiring rapid adjustments to meet unpredictable occurrences affecting the grid. In the aftermath of the Fukushima, Japan disaster on Mar. 11, 2011, the public has increased their volume of dissent. Government regulatory agencies and power plant owners are attempting to address these issues for land based nuclear facilities, but the public is justifiably wary. Japan has currently shut down all nuclear power plants for maintenance and upgrading, and have used the 2012 peak summer season demand to evaluate permanent abandonment of nuclear power for electricity generation. The United States is concurrently promoting and subsidizing the design and implementation of next generation land based reactors, emphasizing small, modular designs to address these concerns. It should be further noted that oceans cover most of the earth's surface and land is comparatively a much more scarce resource.

The prior art offshore nuclear power plants fall into three categories: fixed, floating and submersible. Of the floating concepts and patents, the first was the Sturgis (~1960's), a retired U.S. Navy vessel that was gutted and fitted with an MH1, nuclear generating plant. It provided power for the U.S. Army installation at Lake Gatun, Panama; and although successful, it did not generate commercial interest, and was retired.

In May 2012, World Nuclear News reported that Russia is building a fleet of floating nuclear power plants, which employ their icebreaker nuclear power plants, to be deployed to support mining and hydrocarbon processing in the artic. Resembling cruise ships, the vessels are vunerable in adverse weather and turbulent sea surface conditions.

In another example, U.S. Pat. No. 3,837,308 describes an offshore floating power plant comprised of a double walled spherical shell containing a nuclear reactor powering multiple generators, to produce and export electricity. This plant floats on the surface, anchored to the sea floor and incorporates a unique counter-balance mechanism to mitigate the wave motion on the plant. This costly unproven, complex design was never constructed.

U.S. Pat. No. 3,962,877 describes a fixed offshore power plant encompassing gas or petroleum fired turbines and steam generators encased in the support structure. The support structure extends legs to the seafloor positioning all equipment above the surface of the sea. This design fails to address vulnerabilities to cyclones, tsunami, seismic events, and carbon emission proliferation.

U.S. Pat. No. 4,302,291 describes an underwater nuclear power generating plant comprising a triangular platform formed by tubular legs supporting large spherical pressure vessels and smaller cylindrical auxiliary pressure vessels. The system requires the operators to remain submerged for extended periods and crew and materials transfer would be by submarine rendering it financially unattractive and logistically impractical.

U.S. Pat. No. 4,919,882 describes a modularized nuclear steam supply system installed on a barge and floated to its coffer dam site, which is representative of a plurality of surface floating power plant designs, each having the same advantages in construction cost and time saving, yet however, sharing the same catastrophic disadvantages to include seismic, tsunami, and cyclone vulnerabilities, or the threat of terrorist attack, as well as nuclear environmental impacts, and resource competition with the public.

Yet further in the prior art, U.S. Pub. Pat. App. No. 2009/0256421 describes a nuclear steam system similar to U.S. Pat. No. 4,919,882 above, except that it is self propelled. However, this proposal fails for the same reasons.

U.S. Pat. No. 5,247,553 describes an unmanned "submerged passively safe power station" capable of generating at least 600 MWe utilizing a pressurized water reactor. These power stations are submarine drones which are completely self-contained and operated remotely. The stations are guided into position and tethered above the seafloor. The invention was intended to provide temporary power to aid developing countries with little or no infrastructure and for use in an emergency response to a catastrophe where the usual power plant facilities have sustained damage. This technology has some safety limitations, would be prohibitively expensive, and to date has not been built.

U.S. Pub. Pat. App. No. 2011/0158370 describes an offshore, floating, moored nuclear powered energy carrier plant. This invention proposes using a naval nuclear reactor generator to provide power to hydrocarbon refinement process equipment installed on a standard semi-submersible offshore oil rig. The inventor further specifies that the plant does not export power to the commercial electrical grid, and is inoperable in stormy ocean conditions.

U.S. Pat. No. 7,978,806 describes an un-manned seafloor power station. The reactor generator units are installed in a geodesic sphere which floats submerged, and is tethered with cables to a gravity mat located on the ocean floor. The sphere is raised and lowered by winches for maintenance and refueling. All of the operations of the station are controlled remotely from an onshore base. The invention fails address nuclear fuel consumption and waste proliferation, and cost effectiveness.

Accordingly, mindful of the failings of the prior art, and the immediacy of the need to develop an affordable, sustainable, carbon free means of power generation, a first object of the present invention is to provide an offshore, semi-submersible, floating, moored, modular, nuclear power plant and multipurpose platform.

A second object of the present invention is to provide a method of construction which maximizes the time and cost savings by employing standardized, modularized assembly of the constituent parts on parallel construction pathways, that is achieved by simply employing an existing oil rig and reactor generation module construction methods and manufacturers, who have reduced the construction time of comparably sized oil rigs and navy nuclear modules to less than three years.

A third object of the present invention is to provide said power plant in a manner that minimizes or eliminates the threat of contamination or injury to the general public from operational accidents accomplished by locating the power plant offshore, away from any population, employing naval reactors which have a perfect safety history. Also, locating the power plant in cold water shall prevent any catastrophic melt downs.

A fourth object of the present invention is to protect the public and the power plant from damage and contamination from effects of natural calamities, specifically seismic events, tsunami, and cyclones, that is accomplished by employing the spar or cell spar platform design, proven to insulate the platform from seismic events, tsunami, and cyclones when the present invention is deployed offshore, permitting safe, uninterrupted operations.

A fifth object of present invention is to protect the public and power plant from damage and contamination resulting from a successful terrorist attack, again achieved by deploying offshore and having a "fail safe" capability, which diminishes its target value and provides a clear line of sight of any potential surface terrorist threat. In addition to the safety of isolation, the platform employs the latest navel threat detection technology to prevent a stealth terrorist attack, and can ascend, submerge, and maneuver to inhibit boarding.

A sixth object of the present invention is to prevent any environmental degradation or contamination resulting from power plant operations or location, that is achieved by maintaining a closed loop cooling water system, isolating any radioactive water from contact with seawater. Further, the seawater used in the cooling cycle is returned to the environment at a closely matching ambient seawater temperature. Additionally, to avoid environmental contamination the submerged hull will not be applied with environmentally deleterious antifouling coatings and will be maintained using small submersibles.

A seventh object of the present invention is to eliminate competition with the public for scarce natural resources, specifically potable water and land, that is again, achieved by locating the power plant offshore, minimizing land needs and immersing the power plant in unlimited cooling water, eliminating any competition with the public for said resources.

An eighth object of the present invention is to minimize consumption of nuclear fuel and contributions to nuclear waste repositories, while preventing terrorist acquisition of nuclear material, that is achieved through use of naval nuclear reactors, which require onsite fuel rod exchange only after 20 to 50 years, model dependent, greatly reducing nuclear waste contributions and eliminating the need to maintain an onsite nuclear waste storage facility, removing the attraction to terrorists to steal fuel.

A ninth object of the present invention is to provide a means to efficiently balance the fluctuations in electrical supply/demand, which is achieved by utilizing multiple modular naval nuclear reactors, which are designed for rapid adjustments. Additionally, by deploying a fleet of the present invention, a stable but highly adjustable baseline supply network would by created, capable of mitigating disruptive fluctuations in power supply and demand quickly and efficiently, complementing less predictable and responsive renewable power source such as wind and solar.

A tenth object of the present invention is to avoid the vulnerability of all single reactor nuclear power plant designs to relatively minor component and material failures causing service interruptions; and provide a power plant minimally affected by said failures or required maintenance, that is achieved by utilizing multiple, compact, modular, naval nuclear reactor-generators, that are interconnected through standard steam piping design, facilitating isolation of any failed component(s), allowing all unaffected reactor-generators continued operation, adjusting to mitigate the reduced power contribution, and facilitating repairs without service interruption.

An eleventh object of the present invention is to provide a means to supply ancillary cogeneration services such as; desalinated potable water, hydrogen extraction, and HVAC steam and cooling water for shore based demands, that is achieved by integrating the power generating decks into the submerged hull of the platform, freeing the topside structure to house the required cogeneration equipment, and by diverting steam and electricity from the reactor-generators to the cogeneration equipment as required.

A twelfth object of the present invention is to produce a sustainable, alternative power generation technology that is economically competitive with unsubsidized carbon emitting power generation, including natural gas, thereby providing a means to create a "bridge" to sustainable, all renewable energy generation, that is achieved by the deployment of a fleet of the present invention, which have overnight construction costs and operating expenses, including decommissioning, lower than natural gas fired power plants not including gas fuel costs, providing clear economic incentive to phase out all carbon emitting power plants, as well as existing, aging land based nuclear power plants.

To achieve the foregoing and other objects, and in accordance with the purpose of the present invention as embodied and broadly described herein.

BRIEF SUMMARY OF THE INVENTION

The present invention specifically addresses and alleviates the above mentioned deficiencies; and to achieve the foregoing and other objects, and in accordance with the purpose of the present invention as embodied and broadly described herein, more specifically, the present invention, in a first aspect, is a semi-submersible platform comprising: a scalable, modular, nuclear power plant integrated into the submerged structure of a spar, cell spar platform, or other similar submersible design, comprised of at least one; topside structure, main control deck, central plant deck and submerged reactor generator deck, the reactor generating deck containing multiple naval nuclear reactor-generator modules, capable of generating electricity and steam for export, and cogeneration services.

Also according to various aspects of the present invention, a nuclear power plant is integrated into the submerged hull of an offshore, floating spar or cell spar platform. The invention as presented, employs the same type of platform as currently used in the hydrocarbon industry to drill and extract oil and gas at offshore locations. The spar and cell spar platform have proven to be the safest, most reliable, cost effective and stable offshore floating structures. The present invention incorporates existing technologies from a plurality of internationally competitive manufactures ensuring high quality, competitive pricing, and rapid construction time. The scale and design of each embodiment is task specific, relative to the amount of energy required, location and ancillary services provided. The current art of spar and cell spar platform construction has matured to a highly efficient, assembly line process that has reduced a comparably sized oil services spar rig construction time to less than three years.

The reactor generator secondary containment modules are arranged as cells and are also assembly line constructed and transported to the spar assembly area. In the preferred embodiment, the reactor generator decks, the main control deck, and the central plant deck all interlock to become the submerged dry tank, which is integrated into the structure of the ballast hull. Submerging the reactor generator decks provides significant weight displacement of the heaviest deck, increased platform stability, increased topside decks capacity, and increased reactor thermal efficiency due to the external cold water. The reactor generator decks contain a plurality of reactor generator modules and any equipment necessary to produce and export electricity. In the preferred embodiment, the modules are arranged in a radial configuration around a central elevator shaft/mechanical chase, maximizing space efficiency and facilitating operations with the minimum personnel necessary for safety and efficiency. Also in the preferred embodiment, each reactor-generator module employs and A4W/G, A1B or other compact naval nuclear pressurized water reactor. Each module and cell is a complete power source capable of operating independently and collectively through steam piping configurations, that interconnect all modules; a common practice to anyone familiar with the art. The compact naval reactor-generators are specifically designed for hazardous sea duty and to fit into a restricted space. Further, newer designs provide even greater efficiency in configuration of uranium enriched material and can operate at full power for 20 to 50 years before refueling. Additionally further, onsite refueling may be achieved. Still further in the preferred embodiment, twenty A4W/G reactor-generator modules were assumed, exceeding 20 year core life, and producing approximately 2100MW.

The design of topside decks is task-specific and houses crew, platform command, ancillary cogeneration equipment, and all regulatory and security personnel and equipment. The platform makes its own fresh water and "make-up" water for the steam generators from desalination, and treats its own waste. The platform command may further be equipped with current state of the art sonar, radar and other threat detection equipment. Further, a helipad and crane is provided to enable crew, supplies and equipment to be easily transferred to the platform. The hull can be maintained by submersible equipment. These are major advantages over any shipboard power station in addition to being able to multiply power generation by simply providing a multiplicity of generator modules (for e.g. $2^{nd}$ and $3^{rd}$, etc. reactor generator decks) and cells so that electricity export is attainable.

Yet further, as with all spar platforms, the present invention is designed to remain in place and operational regardless of the severe environmental conditions, for example, during cyclones and tsunami, while adjustable mooring systems insulating the platform from any seismic events. The platform would typically be moored within twenty kilometers shore, facilitating crew and supply exchanges without requiring overnight accommodations for personnel. The present invention is constructed and installed in the same manner as oil rig spar platforms i.e. the ballast hull, topside decks and dry tank components are constructed separately, floated and towed to the location, assembled and moored.

In a second aspect, the invention is a semi-submersible, electrical power generating spar platform, configured with positive buoyancy comprising: a vertical column defining a vertical axis of the platform; a topside deck about the vertical column configured with the positive buoyancy to rise above a sea surface; a main control deck situated below the topside deck, the main control deck also about the vertical column, the main control deck further housing equipment for command and control of the semi-submersible spar platform and power generation and transmission; a reactor generator deck, also about the vertical column for housing a pressurized water nuclear reactor, a steam generator thermally coupled to the reactor and a steam turbine generator for generating electrical power, the reactor generator deck situated below the main control deck; and a heat exchanger configured below the reactor generator deck thermally coupled to a large body of water, the heat exchanger providing heat transfer to a steam cycle comprising the steam turbine generator.

The invention in this aspect is additionally characterized as comprising a plurality of submarine electrical cables configured through the large body of water for distributing electrical power to a power grid. Further the spar platform includes a fail safe device connecting the main control deck to the reactor generating deck, the fail safe device providing quick disconnection of the main control deck from the reactor generating deck. As stated, the spar platform is configured with positive buoyancy and the vertical column comprises a mechanical chase providing a conduit for a piping systems. The vertical column additionally has an elevator shaft for movement of personnel. A topside riser coupled between the top side deck and the main control deck is configured at sea level to the topside riser so that top side deck is above sea level.

In a third aspect, the invention is characterized as a semi-submersible, electrical power generating spar platform, configured with positive buoyancy comprising: a vertical conduit forming an inner circular boundary in a top aspect of a reactor generator deck; and a concentric boundary about the inner circular boundary having a secondary shield containment module therebetween, the inner circular boundary, the concentric boundary and secondary shield containment module forming a reactor generator deck cell spar in said top aspect, wherein the concentric boundary is a dry tank perimeter encircling ten wedges representing the ten operating envelops that form said reactor generator deck cell spar in said top aspect.

The invention in this aspect is additionally characterized where further comprising a plurality of circular cells in said top aspect about an outer circumference of the concentric boundary the plurality of circular cells together housing a plurality of heat exchangers. The semi-submersible, electrical power generating spar platform in this aspect further comprises: a vertical conduit defining a vertical axis of the platform; and a secondary shield containment wall about the vertical conduit and together housing a turbine generator; a nuclear fission reactor thermally coupled to a steam generator and the turbine generator for generating electrical power, the reactor generator deck situated below the main control deck; and a heat exchanger configured below the reactor generator deck thermally coupled to a large body of water, the heat exchanger providing heat transfer to a steam cycle comprising the turbine generator. Also according to specific applications of the invention, generators may be configured for three-phase AC or high voltage DC.

While the apparatus and method has or will be described for the sake of grammatical fluidity with functional explanations, it is to be expressly understood that the claims, unless expressly formulated under 35 USC § 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC § 112 are to be accorded full statutory equivalents under 35 USC § 112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

Figure 1:
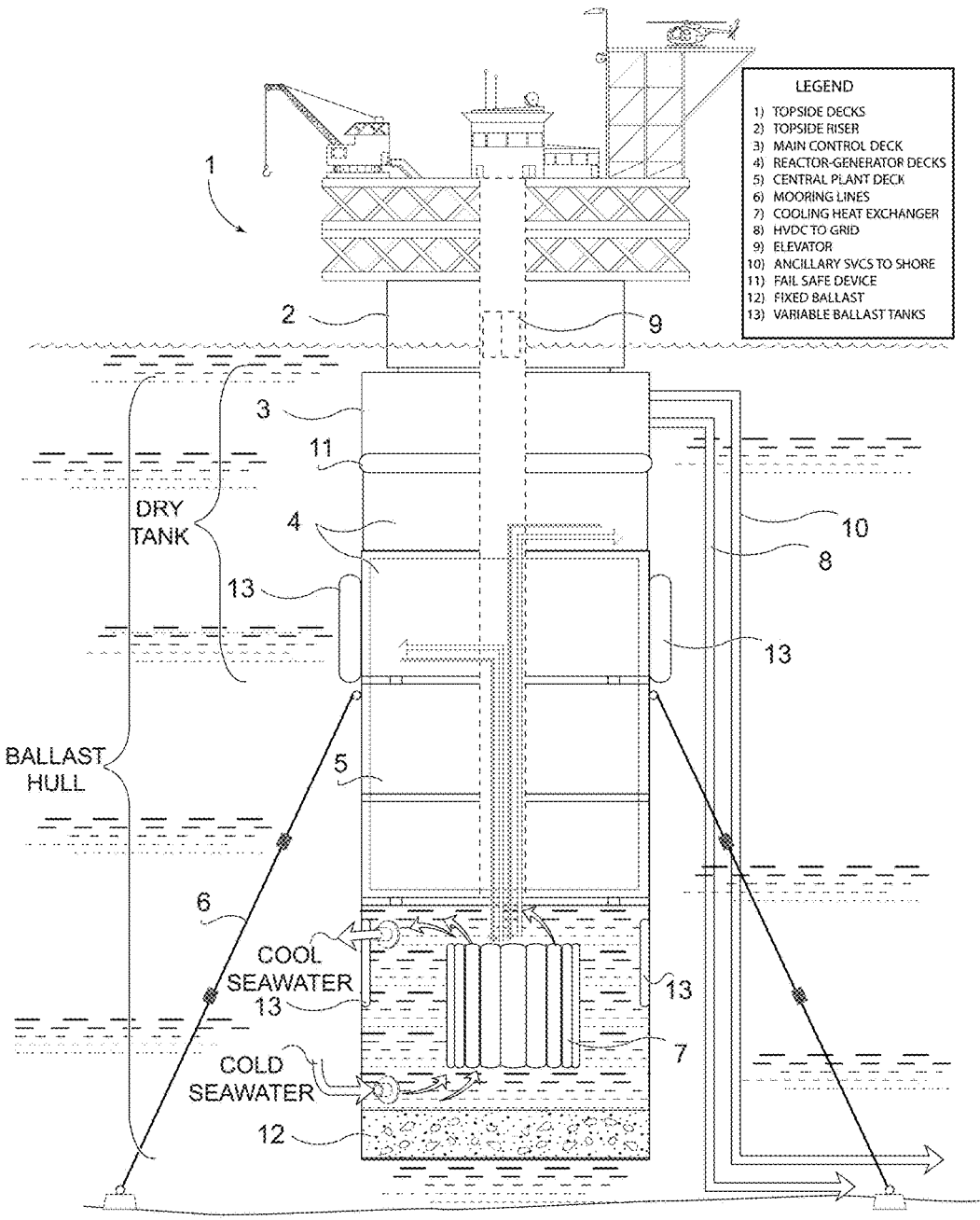
FIG. 1 is an elevation schematical view of the present invention illustrating decks above and below a water line.
Figure 3:
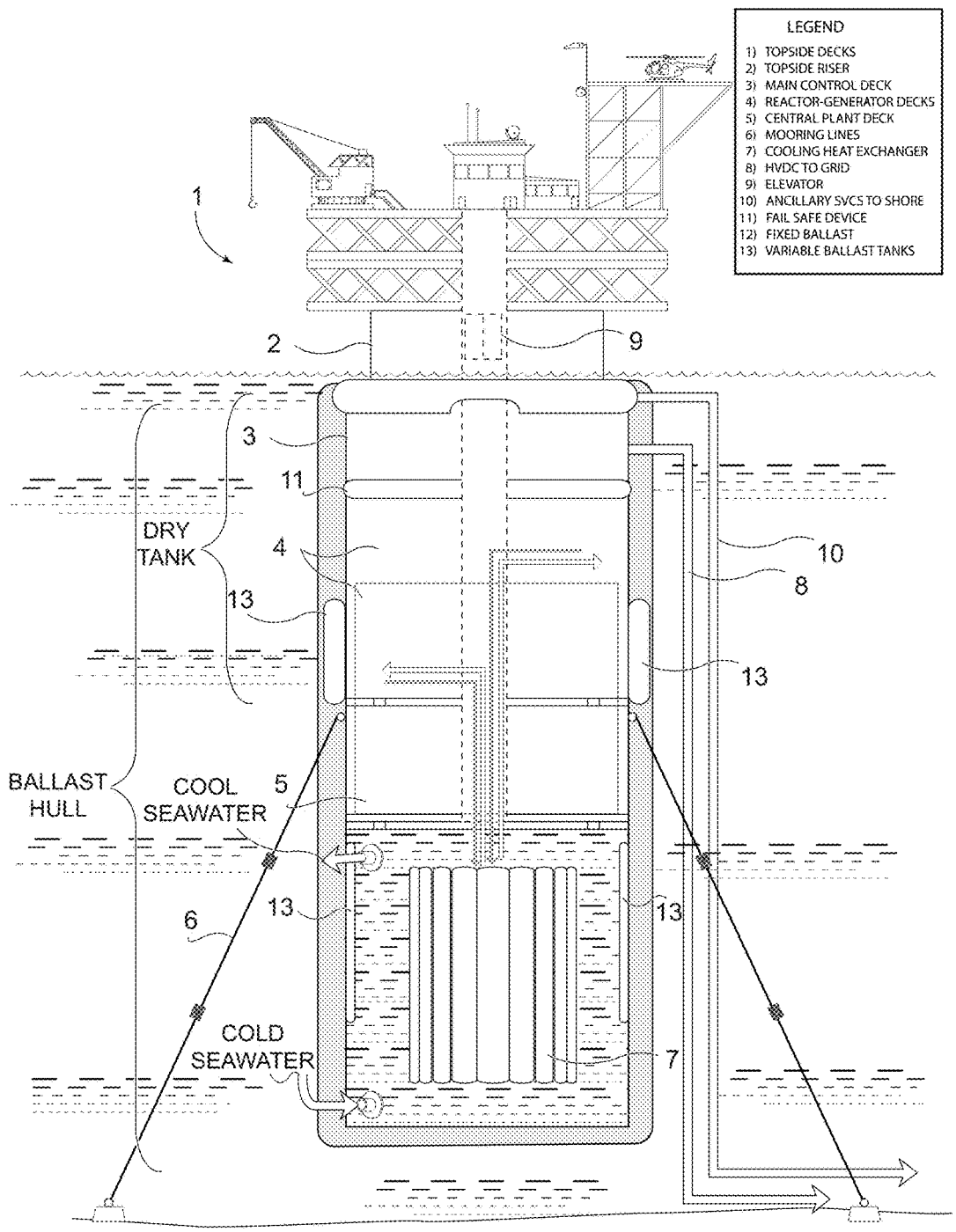
FIG. 3 illustrates an additional configuration of heat exchangers as an alternative embodiment.

Referring initially to FIG. 1 and FIG. 3, alternative embodiments of a spar and cell spar platform are shown showing structural configuration and general stability/buoyancy. Generally, the invention includes a topside deck (1) structure, a cylindrical connecting riser (2), and a submerged dry tank containing the main control deck (3), two reactor generator deck (4), one central plant deck (5), and the ballast hull containing the cooling heat exchangers (7). The scale of the embodiments is similar to the scale of the "Holstein" and "Perdido" spar platforms. The platform overall height is roughly 270 meters with a submerged portion of the spar platform approximately 240 meters and 60 meters in diameter; and the dry tank accounting for 80 meters of the overall submerged height.

Again referring to FIG. 1 and FIG. 3, the topside decks (1) are task specific designed to address a myriad of potential requirements, accommodate any ancillary cogeneration services provided, as well as house all platform personnel, command and control, as well as any ancillary research labs. The design of the topside decks (1) permits "all weather" operability. The helipad and crane facilitate transfer of supplies and personnel to central plant decks (5) via the vertical column housing an elevator (9) and all piping and conduits. The topside riser (2) connects the topside decks (1) and the main control deck (3). Fixed ballast (12) configured at a bottom of the spar platform further providing stability while variable ballast (13) provides buoyancy control.

Still with regard to FIG. 1 and FIG. 3, the "dry tank" assembly is comprised of a main control deck (3), two reactor-generator decks (4), and a central plant deck (5). The main control deck (3) houses all the equipment and personnel necessary to operate a power plant of comparable size. The main control deck (3) is further connected to the reactor generator deck (4) via a fail-safe device (11) allowing for quick disconnection of the reactor-generator deck (4) in the event of catastrophic failure or imminent terrorist threat. The fail safe sequence shuts down the reactors, initiates evacuation, and disconnects from the main control deck (3) allowing the hull to be submerged for subsequent retrieval, flooding the secondary shield containment modules for safety, if needed.

As stated, the reactor-generator decks (4) contain all the reactor-generator modules, which are comprised of equipment contained in the secondary shield sub-module and the unshielded equipment areas of the module. Also as stated in the preferred embodiment, ten A4W/G reactor generator modules are employed per deck yielding approximately 2100 MW. The central plant deck (5) is connected directly under the reactor generator decks (4) and contains all the equipment necessary to support a platform of this size and complement. Additionally, the central plant deck (5) provides an access chamber to an interior of the heat exchanger (7) portion of the hull. The heat exchanger (7) section of the hull contains, among other miscellaneous equipment, the fixed ballast (12), buoyancy devices, and the seawater cooled heat exchangers (7). In the FIG. 1 embodiment, said section is configured directly under the "dry tank" assembly, while in the FIG. 3 embodiment, the heat exchangers are provided in cylindrical cells (FIG. 4) surrounding the "dry tank" assembly. Said cells also serve as storage tanks for fluids generated by any of the ancillary cogeneration services provided. The cooling seawater circulating through the heat exchangers never comes in contact with radioactive sources and the effluent is thermally modulated to blend harmlessly with the surrounding environment minimizing thermal pollution sometimes associated with land based shore plants.

Also referring to FIG. 1 and FIG. 3, two mooring lines (6) represent a plurality of adjustable tension mooring lines attached to permanent anchors. All decks are aligned so the elevator (9) and mechanical chase (82) has unencumbered range through all decks from the deck of the helipad to the base of the central plant deck (5). There are two pairs of directional lines, one white and one shaded gray, representing the cooling water piping between the heat exchangers (7) and the steam condensers located in each of the modules on the reactor-generator decks (4). Also, directional lines (8), (10) represent a plurality of submarine cables (e.g. AC or HVDC) and pipelines facilitating the transfer of electricity through a transformer to the grid, and cogeneration services to shore.

Also with regard to FIG. 1, FIG. 2A and FIG. 2B, the invention is a semi-submersible, electrical power generating spar platform, configured with positive buoyancy comprising: a vertical column defining a vertical axis of the platform; a topside deck about the vertical column (82, 9) configured with the positive buoyancy to rise above a sea surface; a main control deck situated below the topside deck (1), the main control deck (3) also about the vertical column, the main control deck further housing equipment for command and control of the semi-submersible spar platform; a reactor generator deck (4), also about the vertical column for housing a pressurized water nuclear reactor (21), a steam generator (22) thermally coupled to the reactor and a steam turbine generator for generating electrical power, the reactor generator deck situated below the main control deck; and a heat exchanger configured below the reactor generator deck thermally coupled to a large body of water, the heat exchanger (7) providing heat transfer to a steam cycle (FIG. 2B) comprising the steam turbine generator.

Figure 2A:
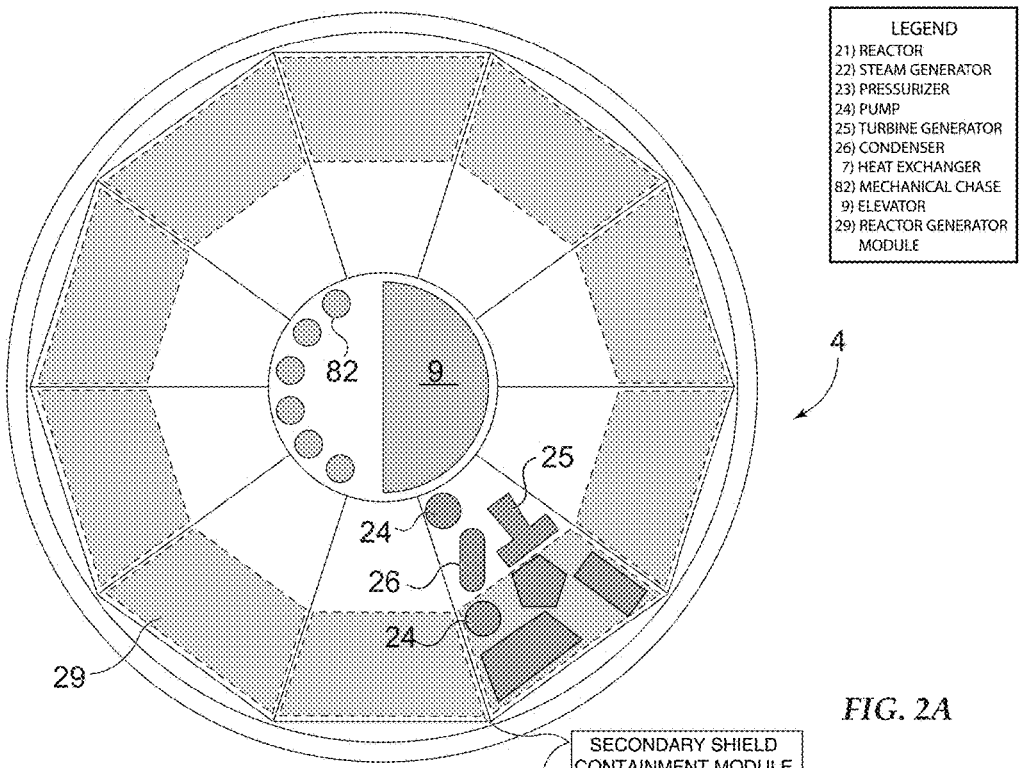
FIG. 2A is a schematical plan view of arrangement of ten reactor generating modules wherein electrical generation is combined for energy export.
Figure 2B:
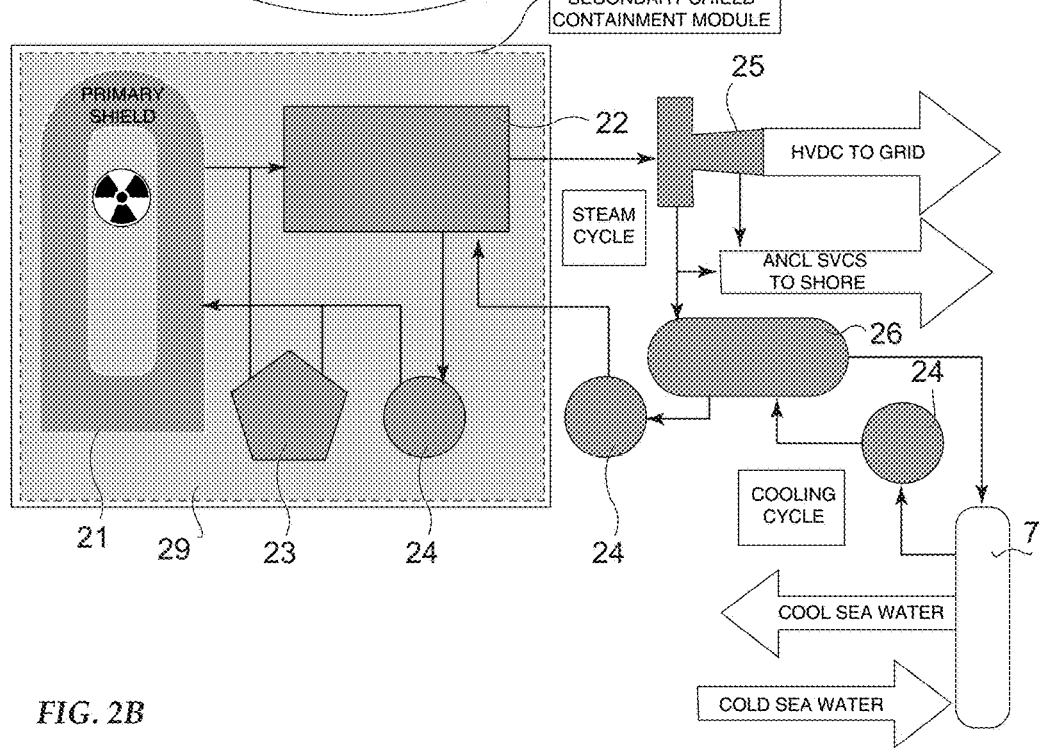
FIG. 2B is a schematical illustration of primary and secondary components used to generate electricity to an export grid.

Further with regard to FIG. 1, FIG. 2A and FIG. 2B, the invention is additionally characterized as comprising a plurality of submarine electrical cables (8) configured through the large body of water for distributing electrical power to a power grid. Further the spar platform includes a fail-safe device (11) connecting the main control deck to the reactor generating deck, the fail safe device providing quick disconnection of the main control deck from the reactor generating deck. As stated, the spar platform is configured with positive buoyancy and the vertical column comprises a mechanical chase (82) providing a conduit for a piping systems. The vertical column additionally has an elevator shaft for movement of personnel. A topside riser (2) coupled between the top side deck and the main control deck is configured at sea level to the topside riser so that top side deck is above sea level.

Also regarding FIG. 2A, the invention is characterized as a semi-submersible, electrical power generating spar platform, configured with positive buoyancy comprising: a vertical conduit forming an inner circular boundary in a top aspect of a reactor generator deck; and a concentric boundary about the inner circular boundary having a secondary shield containment module therebetween, the inner circular boundary, the concentric boundary and secondary shield containment module forming a reactor generator deck cell spar in said top aspect, wherein the concentric boundary is a dry tank perimeter encircling ten wedges representing the ten operating envelops that form said reactor generator deck cell spar in said top aspect.

Figure 4:
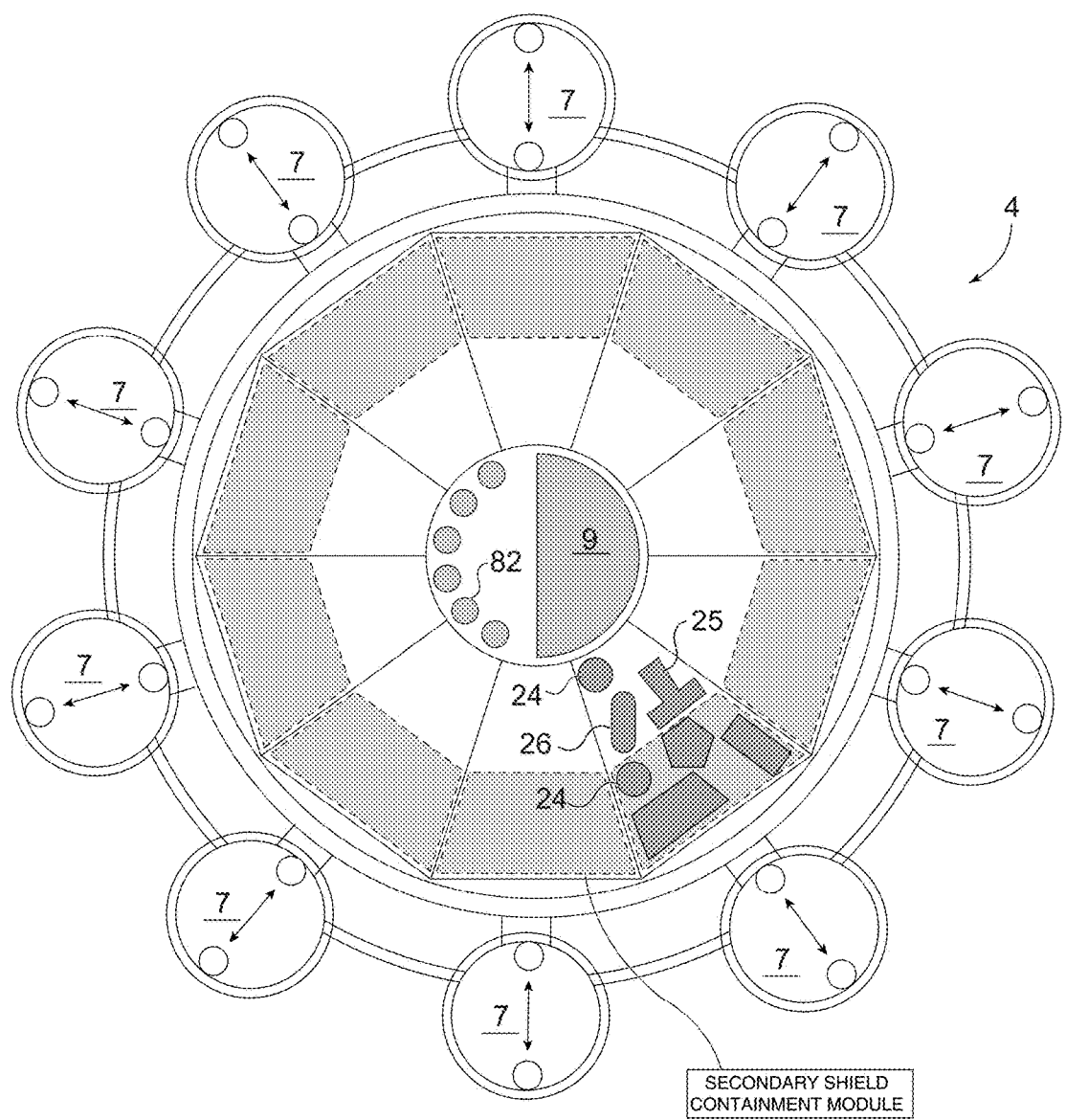
FIG. 4 is a top plan view thereof.

Regarding FIG. 4, the invention further comprises a plurality of circular cells in said top aspect about an outer circumference of the concentric boundary the plurality of circular cells together housing a plurality of heat exchangers (7). The semi-submersible, electrical power generating spar platform in this aspect further comprises: a vertical conduit (82, 9) defining a vertical axis of the platform; and a secondary shield containment wall about the vertical conduit and together housing a turbine generator; a nuclear fission reactor thermally coupled to a steam generator and the turbine generator for generating electrical power, the reactor generator deck situated below the main control deck; and a heat exchanger configured below the reactor generator deck thermally coupled to a large body of water, the heat exchanger providing heat transfer to a steam cycle comprising the turbine generator. Also according to specific applications of the invention, generators may be configured for three-phase AC or high voltage DC.

Yet still further with regard to FIG. 1 and FIG. 3, the invention in a first aspect, is a semi-submersible, electrical power generating spar platform, t with positive buoyancy comprising: a vertical column defining a vertical axis of the platform; a topside deck about the vertical column configured with the positive buoyancy to rise above a sea surface; a main control deck situated below the topside deck, the main control deck also about the vertical column, the main control deck further housing equipment for command and control of the semi-submersible spar platform; a reactor generator deck, also about the vertical column for housing a pressurized water nuclear reactor, a steam generator thermally coupled to the reactor and a steam turbine generator for generating electrical power, the reactor generator deck situated below the main control deck; and a heat exchanger configured below the reactor generator deck thermally coupled to a large body of water, the heat exchanger providing heat transfer to a steam cycle comprising the steam turbine generator.

The invention in this aspect is additionally characterized as comprising a plurality of submarine electrical cables configured through the large body of water for distributing electrical power to a power grid. Further the spar platform includes a fail-safe device connecting the main control deck to the reactor generating deck, the fail safe device providing quick disconnection of the main control deck from the reactor generating deck. As stated, the spar platform is configured with positive buoyancy and the vertical column comprises a mechanical chase providing a conduit for a piping systems. The vertical column additionally has an elevator shaft for movement of personnel. A topside riser coupled between the top side deck and the main control deck is configured at sea level to the topside riser so that top side deck is above sea level.

FIG. 2A and FIG. 4 depict plan views of the reactor generator deck (4) of a spar and cell spar embodiments respectively, and as with elevational views in FIG. 1 and FIG. 3. The two embodiments are identical except that the cell spar (FIG. 4) example has separate cylinders holding the heat exchangers surrounding and attached to the dry tank assembly. Inset FIG. 2B is a process flow diagram depicting a pressurized water reactor and the typical steam and cooling loops and the associated components which are figuratively represented and numbered to coordinate with the components depicted in FIG. 1 and FIG. 3.

Further referring to FIG. 2A and FIG. 4, a solid circular line represents the "dry tank" perimeter, encircling ten wedges representing the ten operating envelopes per deck of the reactor-generator modules, in the preferred embodiments. No physical divisions are provided between unshielded portions of each module. Within each module, a secondary shield containment sub-module are shown as a dashed line. Said sub-module may be constructed and assembled at a factory and shipped to the spar manufacturer and welded into place to complete the module. The secondary shield containment sub-modules are similar in design and assembly process as sub-modules used in U.S. Navy nuclear vessels, and are supplied by the same manufactures, or those meeting the same safety certification criteria. Said modules in the preferred embodiment are arranged radially, surrounding a central vertical column containing a central elevator (9) and mechanical chase (82), maximizing space utilization and reducing the number of personnel required for safe operation. The vertical column is also the common conduit between the central plant deck (5) and helipad for all cooling piping, electrical systems and any other mechanical equipment, represented as a series of circles in the vertical column schematical illustration.

Regarding FIG. 1, FIG. 2, FIG. 2B, FIG. 3 and FIG. 4, schematic figures are provided; and one of ordinary skill in the platform and shipbuilding arts would appreciate how components could be connected by steel-making and welding processes known for decades. For example, the spar platform could be made from high tensile strength steel such as A36 standard alloy. Piping systems and pressure vessels will have steel with excellent corrosion properties and have optimum brittle fracture properties. In addition wielding materials and procedures are provided with properties easily inspected and tested and re-tested. Steel used for constructing these components may be austenitic stainless steel, 300 Series for example. Primary and secondary shielding material are also known and may comprise various combinations of lead, steel concrete or liquid boundary.

As stated, the reactor vessel is of a type that is well known, pressurized water fission reactor, for example, with a water moderator of neutron flux with will inherent shut itself down when water is removed as in an overheating situation. Also regarding platform construction, Harvey et al., U.S. Pat. No. 3,837,308 may be incorporated by reference herein as providing useful background information.

While the particular Semi-Submersible Nuclear Plant and Multipurpose Platform herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. A semi-submersible, electrical power generating spar platform, configured with positive buoyancy comprising:
a vertical column defining a vertical axis of the platform;
a topside deck about the vertical column together configured with the positive buoyancy to rise above a sea surface;
a main control deck situated below the topside deck, the main control deck also about the vertical column, the main control deck further housing equipment for command and control of the semi-submersible spar platform;
a reactor generator deck, also about the vertical column for housing a pressurized water nuclear reactor, a steam generator thermally coupled to the reactor and a steam turbine generator for generating electrical power, the reactor generator deck situated below the main control deck;
a heat exchanger configured below the reactor generator deck, the heat exchanger further thermally coupled to a body of water, the heat exchanger being configured below the main control deck and the reactor generator deck;
a cylindrical seawater tank housing said heat exchanger thereby housing the heat exchanger in a wet tank;
a cool seawater effluent configured to the cylindrical seawater tank; and
a cold seawater inlet configured to the cylindrical seawater tank below the cool seawater effluent, wherein the wet tank provides ballast, buoyancy control and stability to the spar platform, wherein the heat exchanger further provides heat transfer to a steam cycle comprising the steam turbine generator, further wherein the vertical column extends down below the sea surface through the main control deck and through the reactor generator deck.

2. The semi-submersible, electrical power generating spar platform, configured with positive buoyancy of claim 1 further comprising:
a variable ballast tank configured inside the cylindrical seawater tank further providing ballast and buoyancy control; and
a fixed ballast configured below the reactor generator deck and below the heat exchanger further providing stability to the spar platform.

3. The semi-submersible, electrical power generating spar platform, configured with positive buoyancy of claim 1, wherein said vertical column comprises a mechanical chase inside the vertical column providing a conduit for a piping system, wherein the vertical column further comprises an elevator shaft inside the vertical column adjacent to the mechanical chase.

4. The semi-submersible, electrical power generating spar platform, configured with positive buoyancy of claim 1, further comprising a topside riser coupled between the top side deck and the main control deck, the topside riser configured at sea level so that top side deck is above sea level, the topside riser further including a diameter smaller than a diameter of the top side deck.

* * * * *